(No Model.)

J. T. CLARKSON.
SHIFTING SEAT CARRIAGE.

No. 446,429. Patented Feb. 17, 1891.

Witnesses:
Eugene Humphrey
L. W. Howes

Inventor:
Joseph T. Clarkson
per J. W. Porter Atty

UNITED STATES PATENT OFFICE.

JOSEPH T. CLARKSON, OF AMESBURY, MASSACHUSETTS.

SHIFTING-SEAT CARRIAGE.

SPECIFICATION forming part of Letters Patent No. 446,429, dated February 17, 1891.

Application filed March 29, 1890. Serial No. 345,853. (No model.)

*To all whom it may concern:*

Be it known that I, JOSEPH T. CLARKSON, of Amesbury, in the county of Essex and State of Massachusetts, have invented a new and useful Improvement in Carriages, which will, in connection with the accompanying drawings, be hereinafter fully described, and specifically defined in the appended claims.

Figure 1:
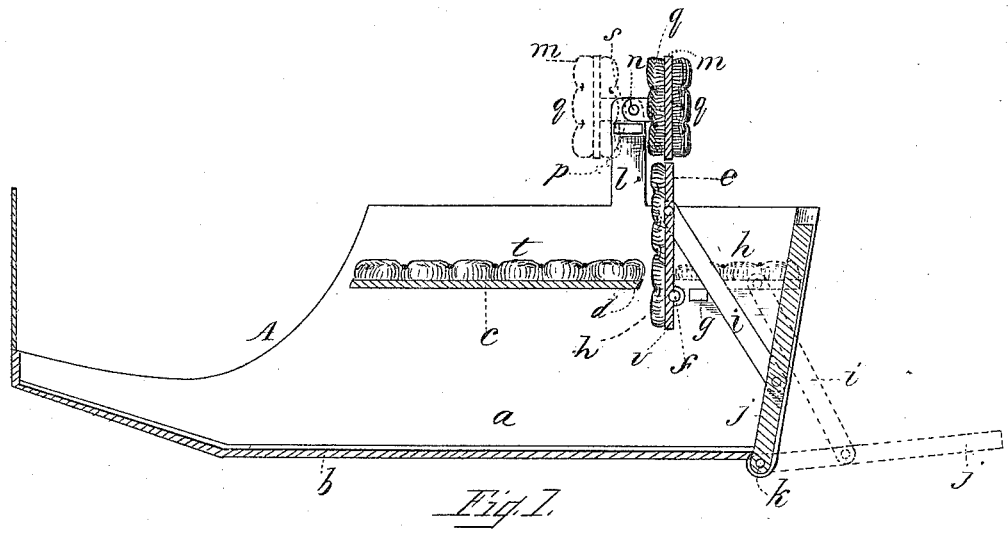
Figure 2:
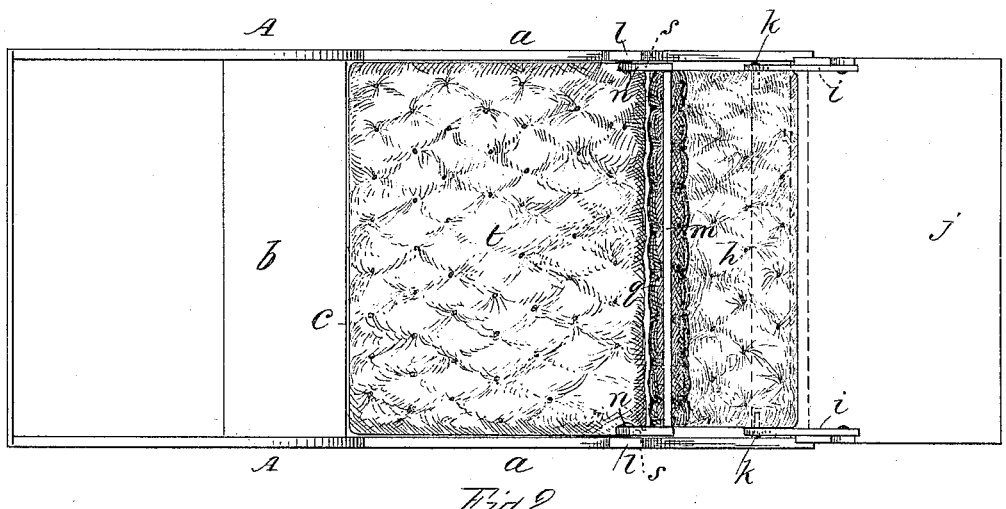

In said drawings, Figure 1 is a sectional elevation, the section being vertical and longitudinal through the body and the elevation showing the right-hand side of the body as viewed from the left-hand side. Fig. 2 is a top plan view of Fig. 1, the parts shown by dotted lines in Fig. 1 being in Fig. 2 shown in the same positions as they are shown by said dotted lines in Fig. 1.

This invention relates to that class of carriages which are adapted and intended to be used at will either as a single-seat or double-seat carriage—that is, which may be arranged with only a seat in which the occupants face to the front, or with one such seat and another seat the occupants whereof face to the rear; and it consists in features of novelty that will hereinafter be pointed out and claimed.

Referring again to said drawings, A represents the body, of which $a\ a$ are the sides and $b$ the bottom. The front seat is shown at $c$ as overlaid with the cushion $t$ and terminating rearward at $d$. The bottom of the rear seat is shown at $e$, which is pivoted at $f$ below its plane and in rear of $d$, so that when it is turned down upon the stop or ledge $g$, secured to $a$, the top of $e$ will be flush with the top of $c$ and the front edge $v$ of $e$ will be close to the rear edge $d$ of bottom $c$, while when $e$ is turned up the plane of its cushion $h$ will be close to the rear edge $d$ of the front seat, and also close to the rear edge of its cushion $t$, and both the rear seat and its cushion extend below the top of the front seat. The tail-board is shown at $j$, hinged to the rear lower part of the body at $k$ and connected by rods $i$ with rear seat $e$ at such distances from the respective pivots of $e$ and $j$ that when $j$ is duly opened out to serve as the foot-board of the occupants of seat $e$ the latter will rest upon stop $g$, thereby sustaining the seat and foot-board in position, and when $j$ is turned up to serve as the tail-board seat $e$ will be in position to serve as a part of the back of the front seat, it then being directly below $m$.

A removable seat-back is shown at $m$ as pivoted by its arm $s$ at $n$ to standards $l$, that rise from the sides $a$ of the body at a point between the middle and rear edge of seat $c$. Said back $m$ is shown as provided with a cushion $q$ on each side, and when the back is turned rearward it coincides with $e$, (which is then turned up,) and the then front cushion $q$ coincides with cushion $h$ on $e$, thus affording a deep (or wide) front seat $c\ t$ and a high continuous back $e\ m$, with their cushions $h\ q$, while when the tail-board $j$ is turned down to serve as a rear foot-board and $e$ is thereby turned down to constitute a portion of the rear seat the back $m$ is turned forward, as shown in Fig. 2 and by dotted lines in Fig. 1, thereby rendering the front and rear seats of equal width, as by thus turning back $m$ forward a sufficient portion of $c$ is added to $e$ to accomplish such equalization.

I am aware that reversible seat-backs are not new, and that tail-boards arranged to be turned outward to serve as foot-boards are also old. Hence I do not claim either, broadly; but in the combinations and arrangements and with the new results which I accomplish, as by the construction and arrangements of the parts in my carriage, the front seat is not, as heretofore, reversed when back $m$ is reversed, but, on the contrary, the occupant of the front seat always faces to the front, while the occupants of the rear seat always face to the rear, while the reversal of the back as heretofore arranged has rendered the facing of the occupants of the seat in a direction the opposite of what it was before such reversing of the back an absolute necessity, and the co-acting of seat $e$ with back $m$ when $e$ is raised by the closing of tail-board is, I believe, entirely new and novel.

I claim as my invention—

1. In combination with a vehicle-seat, an adjustable back having a short arm extended outward from the plane of the back and pivoted between the center and one edge of the seat, whereby the reversing of the back varies the depth from front to rear of the seat without reversing the same, substantially as specified.

2. In combination, a non-reversible carriage-seat and a reversible back supported near one edge of the seat and arranged to vary the depth of the seat as the back may be reversed, substantially as specified.

3. The combination, with non-reversible seat $c$, of reversible back $m$, having short arms $s$, pivots $n$, arranged between the front and rear edges of the seat and at one side of the fore and aft center thereof, whereby the reversal of the back in either direction will not reverse the seat, but will vary the depth from front to rear thereof, substantially as specified.

4. The combination of a front seat, an elevated back for said seat, and a rear seat arranged to be turned up and form a continuation downward of said elevated back from thence to said front seat, substantially as specified.

5. The combination, with front seat $c$, of rear seat $e$, hinged at a point in rear of its front edge and so that when turned down it forms with seat $c$ a continuous plane, and when turned up to serve as a back for the front seat its edge extends below the top of the front seat and space is provided between the top of $e$ and rear edge of $c$ for the thickness of the cushion of seat $c$, substantially as specified.

6. The combination of front seat $c$, its reversible back $m$, the hinged rear seat $e$, tail-board $j$, and a connection between the same and said rear seat, substantially as specified.

7. The combination, with back $m$, supported above the seats, of rear seat $e$, hinged and arranged to be turned up beneath said back to co-operate therewith in forming a full-height back, and the hinged tail-board pivotally connected with and arranged to actuate said rear seat, substantially as specified.

JOSEPH T. CLARKSON.

Witnesses:
GEORGE H. BRIGGS,
WILLIAM T. CLARKSON.